H. BOWERS.
Wheel-Cultivator.
No. {2,125, 33,129.}
Patented Aug. 27, 1861.
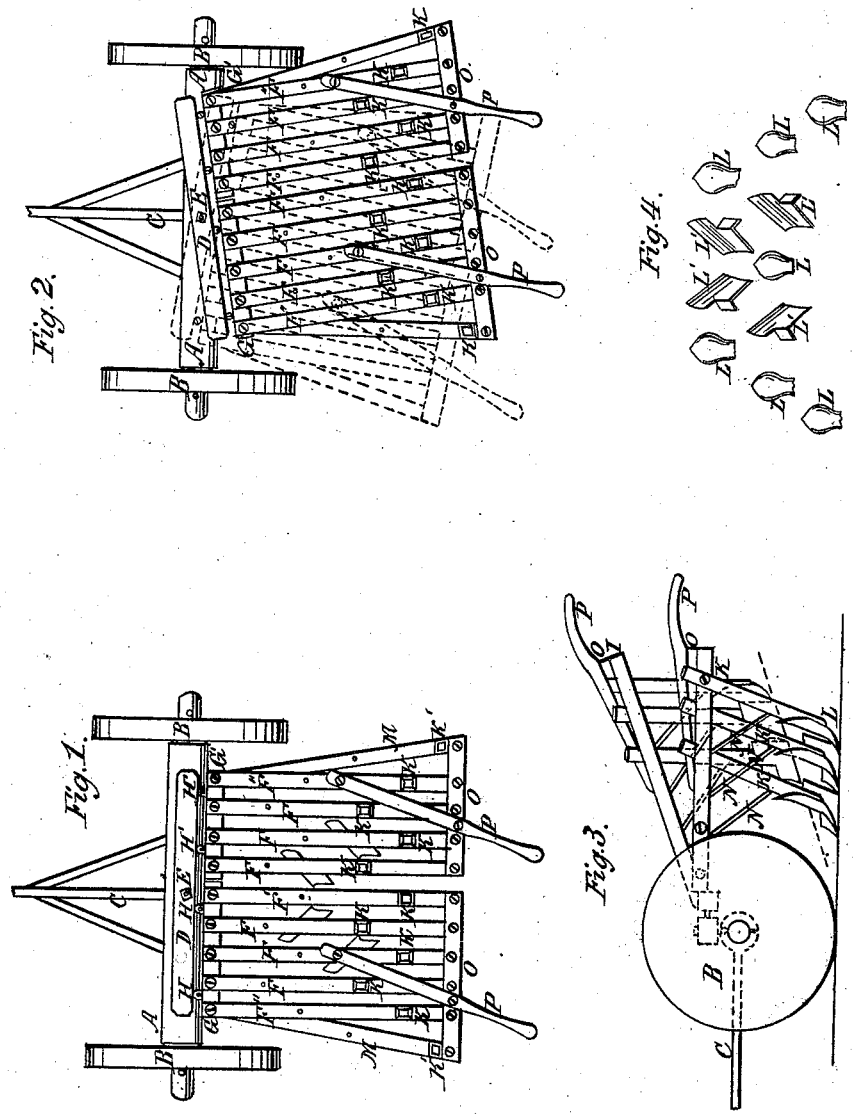
Witnesses.
J. Brainerd.
J. B. Loomis.
Inventor.
H. Bowers.
by attys B & B

UNITED STATES PATENT OFFICE.

HENRY BOWERS, OF NEW HUDSON, MICHIGAN.

IMPROVEMENT IN CULTIVATORS.

Specification forming part of Letters Patent No. 33,129, dated August 27, 1861.

*To all whom it may concern:*

Be it known that I, HENRY BOWERS, of New Hudson, in the county of Oakland and State of Michigan, have invented new and useful Improvements in Cultivators; and I do hereby declare that the following is a full and complete description of the construction and operation of the same, reference being had to the accompanying drawings, making part of this specification, in which—

Figure 1 is a top view. Fig. 2 is a top view with the cultivators swung around to the right. Fig. 3 is a side view, and Fig. 4 shows the position and form of the cultivator-teeth.

Like letters refer to like parts in the several views.

The nature of my invention relates to the special arrangement of parts hereinafter described.

The wheels may consist of ordinary wagon-wheels, to which a wooden axle-tree of suitable length can be fitted. This axle-tree A should be of such length that each wheel B will traverse nearly in the center of the space between the rows of corn. A neap, c, can be attached in any convenient manner.

The bolster D, Figs. 1 and 2, consists of a piece of timber about four by three inches and long enough to nearly fill the space between the wheels. A king-bolt, E, passes through its center and through the center of the axle-tree, forming a pivot or pin, upon which it turns either to the right or left, as seen in Fig. 2.

The beams F of the cultivator-frame are attached by their forward ends to the pieces G G', and which are hinged to the axle-tree at H H', Figs. 1 and 2, thus allowing each section thus formed an independent vertical motion, as shown at I in Fig. 3. It will be observed that the piece G is longer than the piece G', and that it extends a little past the king-bolt E, the object of which is the attachment of the cultivator-beam F' at a point exactly intermediate between the wheels when the cultivator is used for fallow ground; but in cultivating corn and other crops planted in rows the beam F' and its attachments are detached, as may also be those on either side thereof.

The arms K K', to which the teeth or hoes L L' are attached, are secured to the beams F F' in alternate position, as shown in Figs. 1, 2, and 4. The arms K' are secured to false beams M, placed obliquely to the others, and attached to the forward ends of the outer beams at F''. This brings the outer teeth in the series more nearly in the track of the wheels; but both the arms K' may be removed in the cultivation of corn, &c. The arms K K' are supported by braces N, as seen in Fig. 3. The teeth or hoes may be of any desired form. I prefer those represented in Fig. 4. Those indicated at L' may be so placed as to throw the soil to or from the hill, as may be desirable, for the first or second hoeing. The hind ends of the beams F F' and M are secured by bolts or screws to the pieces O. The handles P are placed obliquely, as shown in Figs. 1 and 2, so that the operator can walk behind the machine between the rows and still have complete control of its movements.

This cultivator is designed to be drawn by two horses, one walking upon each side of the row, and the operator walking behind the near side horse. In this position both handles will be within his reach, and he can easily lift either one or both sets of teeth from the ground to avoid obstructions, or swing them to the right or left to accommodate any crook in the rows, and in changing from one row to another at the edge of the field the transfer is easily made by lifting both sections from the ground by the handles P, the forward end of the frame being supported by the axle-tree and wheels.

What I claim as my improvement, and desire to secure by Letters Patent, is—

The bolster D, king-bolt E, axle A, neap C, beams F F' M, pieces G G', hinges H H', standard or arms K, braces N, plows or hoes L L', and handles P, the whole being constructed, combined, arranged, and operating as and for the purposes herein described.

HENRY BOWERS.

Witnesses:
  J. BRAINERD,
  E. F. OLDS.